United States Patent [19]

Jackson

[11] 4,089,979

[45] May 16, 1978

[54] FORMULATION OF FEED ADDITIVES, MINERAL SUPPLEMENTS AND LIQUID FEEDS FOR ANIMALS AND PRESERVATIVES FOR SILAGE, HAY AND GRAIN

[75] Inventor: Peter Jackson, Bracknell, England

[73] Assignee: Imperial Chemical Industries Limited, London, England

[21] Appl. No.: 564,750

[22] Filed: Apr. 3, 1975

Related U.S. Application Data

[63] Continuation of Ser. No. 370,790, Jun. 18, 1973, abandoned.

[30] Foreign Application Priority Data

Jun. 30, 1972 United Kingdom ............... 30765/72

[51] Int. Cl.$^2$ ............................................. A23K 1/22
[52] U.S. Cl. ...................................... 426/69; 426/573; 426/807
[58] Field of Search ................... 426/69, 74, 573, 575, 426/807, 635, 655, 658; 71/29; 424/78, 322; 252/315-317

[56] References Cited

U.S. PATENT DOCUMENTS

| 2,748,001 | 5/1956 | Anderson | 426/69 |
| 3,576,642 | 4/1971 | Currie | 426/69 |
| 3,754,925 | 8/1973 | Kimura | 426/573 |
| 3,878,304 | 4/1975 | Moore | 426/69 |
| 3,895,117 | 7/1975 | Backlund | 426/69 |
| 3,901,976 | 8/1975 | Roth | 426/807 |

FOREIGN PATENT DOCUMENTS 1,202,048  8/1970  United Kingdom ................... 426/69

*Primary Examiner*—Hiram H. Bernstein
*Attorney, Agent, or Firm*—Cushman, Darby & Cushman

[57] ABSTRACT

Liquid compositions, such as animal feeds, feed additives, mineral supplements and preservatives for hay, silage, grain, include a thixotropic agent, such as a hydrophilic colloid, which causes the compositions to form pseudoplastic, thixotropic gels and as an active ingredient urea, urea phosphate, phosphoric acid or mixtures thereof.

4 Claims, No Drawings

FORMULATION OF FEED ADDITIVES, MINERAL SUPPLEMENTS AND LIQUID FEEDS FOR ANIMALS AND PRESERVATIVES FOR SILAGE, HAY AND GRAIN

This is a continuation of application Ser. No. 370,790 filed June 18, 1973 and now abandoned.

The present invention relates to improvements in or relating to the formulation of liquid feeds, feed additives and mineral supplements for animals, and preservatives for silage, hay and grain.

It is well-known that there are difficulties in formulating satisfactory liquid feeds for animals. For example:
a. The liquid feed must be viscous enough to stick on a ball or roller type dispenser, and yet be sufficiently free flowing to be poured into a feeder from a tanker or drum.
b. At the present time, the correct viscosity is usually achieved by the use of molasses. This is an unsatisfactory answer to the problem, since the molasses tends to ferment, and this can only be prevented by the use of costly preservatives and,
c. The mineral content of the feed tends to sediment out.
d. Formulation of a liquid feed requires the manufacture of a concentrated liquid premix, which must then be transported, sometimes over large distances, to blending sub-depots where the molasses is added. This minimises the opportunity for the molasses to ferment, but greatly increases transport costs.

These problems prompted us to search for possible thickening agents for liquid feeds and this, in turn, led us to examine the effect of incorporating small quantities of thixotropic agents in liquid feeds for animals. We found that this produces liquid feeds which gel on standing and are viscous, but which are rendered free-flowing by shaking or pressure. Further testing showed that it is possible to produce a dry premix containing the animal feed in powder form and a small quantity of a thixotropic agent which, upon mixing with a liquid e.g. water or a water-miscible liquid, produces a thixotropic liquid feed gel. Such a gel could be sold to farmers ready for use, or one could sell them the dry premix to which they merely have to add water. Another alternative would be to sell them a very concentrated gel to which they would merely have to add additional water. The latter alternative would probably be the most acceptable from the farmer's point of view if one or more of the ingredients of the feed is normally liquid, since he, himself, would have to add the liquid ingredient to the dry premix. Further tests have shown that feed additives, mineral supplements for animals and additives for silage, hay or grain can also be prepared in the form of similar thixotropic gels.

THIXOTROPIC GELS - USES

The properties of thixotropic agents make them suitable for the following uses:

Liquid feeds

To impart free-flowing characteristics for dispensing the liquid feed from a drum or tanker, but to form a viscous gel on standing. This gel ensures even dispersion of minerals and vitamins and makes trace metals more available to the animal by the formation of chelates.

Mineral supplements and feed additives

Problems with the use of dry mineral supplements and feed additives in feed formulations include difficulty of dispersion and mixing out. The use of a thixotropic agent overcomes these difficulties. It can be sprayed into a mixer for feed constituents and gels on contact with them, effectively coating them with a thin film of minerals and ensuring even dispersion. The viscous nature of the re-formed gel allows the constituents to bind together more readily, thus reducing losses from dust formation during mixing. The thixotropic agent can thus effectively replace present pellet binders, giving added value to the mineral supplement. During pelleting, the pseudoplastic nature of the gel under pressure acts as a lubricant and reduces the power requirement.

Silage, Hay or Grain Additives

Thixotropic gels are used in rust-killing agents to allow intimate contact with the surface to be treated, and hence minimising the amount of active ingredient required. A similar effect is desirable and has been observed in the treatment of silage, hay or grain with additives in the form of thixotropic gels. They also have the following advantages:
i. They simplify and improve the application of preservative materials presently in use.
ii. They reduce transportation costs, since a concentrated gel can readily be diluted on the farm.
iii. They are safer, involving less risk during use and possibly reducing the vapour pressure of the formaldehyde and/or acids which are currently used in many preservatives.
iv. Their concentration allows the addition of similar gelled mineral supplements to the spray tank before the combined mixture is applied to the silage, hay or grain.
v. Re-formation of the gel in the silage reduces losses of minerals in the effluent, and also minimises respiration losses.

THIXOTROPIC AGENTS

Chemical Structure

The thixotropic agents of particular interest in the present invention are hydrophilic colloids. They are complex polymers with molecular weights usually in excess of one million. The following types of polymers are particularly useful examples:
a. Xanthan gums, i.e. the Kelzan range (made by Kelco Ltd., Chicago). The gums are made by a pure culture fermentation process with Xanthamonas compestras species. The gums are extracted with isopropanol. They are high polymers, linear in structure with a $\beta$-linked backbone containing D glucose, D mannose and D glucuronic acid with one D mannose side chain unit for every eight sugar residues and one D glucose side chain residue for every sixteen sugar residues. The polymers are partially acetylated polysaccharides and contain pyrurric acid attached to the glucose side chain residue. The molar ratio of D glucose to D mannose to D glucuronic acid is 2.8:3.0:2.0.
b. Carbopol resins (made by BF Goodrich Ltd., Cleveland, Ohio). These resins are carboxy vinyl polymers of extremely high molecular weight. They are acid in nature and require neutralixation to develop optium properties.

c. Viscalex and Versial polymers (made by Allied Colloid Manufacturing Co., Bradford). These are high molecular weight water-soluble polymers based on sodium polyacrylate.

d. Viscofas and Gantrezan (made respectively by ICI and General Aniline and Film Co. New York). These are copolymers of methyl vinyl ether and maleic anhydride. They are water-soluble polyelectrolytes of high molecular weight.

e. Natrosols (made by Hercules Corporation, Wilmington, DE. USA). Natrosols are non-ionic water-soluble polymers derived from cellulose.

f. Biomass (single cell protein). The preliminary treatment of bacterial protein with an organic solvent makes the polysaccharide content of this material act as a suitable thixotropic agent. If the organic solvent is also a suitable energy source, it is possible to use the total treated biomass in formulations.

Chemical and Physical Properties a. These thixotropic agents exhibit extreme pseudoplasticity - high viscosity under low shear, but low viscosity under high shear.

b. Their viscosity shows practically no change with temperature variation.

c. They are soluble and stable in acid and alkaline solutions.

d. They possess good suspending properties for particles which are difficult to suspend.

e. They exhibit compatability and stability in solutions containing high concentrations of various salts.

f. They are heat-stable, even at very high temperatures.

g. They are soluble in hot and cold water.

h. Aqueous solutions thereof possess good lubricating properties and a pleasant skim feel.

i. They are effective emulsion stabilizers.

j. They possess freeze - thaw stability.

Mode of action

These thixotropic agents act by the formation of cross linkages between polymer chains to give a matrix which will absorb solutions. The solution structure is sufficient to prevent fine solid particles from settling or oil drops from rising. These solutions exhibit a pseudoplastic nature, and on agitation lose their viscosity and pour readily. On standing, the gel re-forms. This pseudoplasticity is a function of the concentration of the thixotropic agent, the solution pH, and the concentration and valency of metal ions present. Variations in these factors allow suitable pseudoplasticity to be achieved under diverse conditions. The presence of borates is particularly useful in this respect.

Stability

The gels exhibit good stability with salts over storage times of several months.

The present invention accordingly provides a composition including an active ingredient comprising at least one feedstuff, feed additive or mineral supplement for animals, or at least one additive for silage, hay or grain, in admixture with a thixotropic agent which is present in an amount such that, in the presence of a predetermined quantity of liquid, the composition forms a psuedoplastic thixotropic gel.

The active ingredient may be a dry solid premixed with the dry thixotropic agent. Purely by way of example, the latter may comprise between about 0.05% and 5% (preferably between about 0.2% and 3%) by weight of the psuedoplastic thixotropic gel which results upon dilution of the dry premix with a liquid such as water. Alternatively, the active ingredient may be a solution, dispersion, emulsion or the like, preferably as concentrated as possible in order to minimise transport, packaging and storage costs, premixed with the same amount of thixotropic agent as the dry premix, and which is subsequently diluted to form a pseudoplastic thixotropic gel containing the thixotropic agent in the above-mentioned range of percentages.

The pseudoplstic thixotropic gels formed from such premixes of active ingredient and thixotropic agent have the following characteristics:

(a) They flow under pressure, as for instance during spraying or when sheared by stirring, shaking or other agitation, but reform upon standing.

(b) At the same time, their solution structure maintains the even dispersion of minerals, vitamins and other feed constituents, such as fats, waxes, growth-promoters, antioxidants, medicaments etc.

The formed thixotropic gels may be used as the base for:

a. Liquid feed supplements, to be fed alongside fresh grass, hay, silage, straw or other animal feeds, either via liquid feed dispensers or by spraying onto fresh grass or silage.

b. Feed blocks for the same purpose.

c. Protein concentrates for admixture with cereals or other energy sources to produce concentrated feeds.

d. Mineral supplements to be added to grain, hay or silage additives, or direct to silage, hay or grain.

In these formulations, the formed pseudoplastic thixotropic gels have at least one, and possibly all, of the following advantages:

i. Even dispersion or suspension of minerals, vitamins, fats or other solids or oils in the liquid feeds or solid blocks or concentrates.

ii. The ability to coat feed particles, thus minimising losses due to the formation of dust and spoilage of pelleted feeds by the breakdown of the pellet.

iii. They act as pellet binders in the place of the usually accepted clays or lignosulphonates.

iv. They act as lubricants during pelleting, thus enhancing throughput from pelleting apparatus.

v. They act as chelating agents to hold trace metals in the mineral supplement and prevent them from destroying the activity of the vitamins in the feed.

vi. They act as antioxidants to prevent the breakdown of fats and oils in the feed.

When used in conjunction with antifungal or antibacterial agents, the thixotropic gels allow feeds to be formulated at high moisture content without the risk of mould growth occurring.

VITAMIN/MINERAL SUPPLEMENT FORMULATIONS

Six vitamin/mineral supplement formulations suitable for use in the invention are listed in the accompanying Table I, by way of example only. The formulations additionally contain between 0.1 and 3% of a thixotropic agent, so that, upon dilution to 100% with water, pseudoplasticity is achieved. In the Biostok formulation, the phosphorus is supplied as urea phosphate. The sources of mineral and trace metals are preferably chosen on the basis of solubility as well as cost. It is preferred to use either oxides or sulphates, though chlorides and acetates are acceptable. Liquid feed and block formulations may be based on those for the mineral supplements, together with additional molasses and hardening agents as required.

TABLE I

| Products | Urea | Ca | Mg | NaCl | P | Fe | Cu | Co | Mn | I | Zn | Vit D$_3$ | Vit A | Vit B$_2$ |
|---|---|---|---|---|---|---|---|---|---|---|---|---|---|---|
| | % | | | | | | ppm | | | | | iu/lb | iu/lb | mg/lb |
| Biostock | 35 | 16 | 0.77 | 16.8 | 2.8 | 0.35 | 75 | 60 | 770 | 60 | 0 | 12,500 | 62,500 | |
| ICI Dairy | 0 | 15 | 5.0 | 26.0 | 11.0 | 0.3 | 250 | 260 | 637 | 250 | 0 | 50,000 | | |
| ICI High Magnesium | 0 | 6 | 37.0 | 5.5 | 3.5 | 1.5 | 150 | 150 | 390 | 150 | 0 | 55,000 | | |
| ICI Sheep and Beet | 0 | 28 | 1.0 | 11.8 | 7.0 | 0.7 | 250 | 120 | 320 | 120 | 0 | 55,000 | | |
| ICI Pigs | 0 | 24.4 | | 23.0 | 4.0 | 1.0 | 600 | 100 | 2000 | 200 | 1.12 | 35,000 | 140,000 | 80 |
| ICI High P for Dairy | 0 | 10 | 0.65 | 12.0 | 15.0 | 3.0 | 83 | 110 | 212 | 83 | 0 | 25,000 | 100,000 | |

Experiments were conducted to see if molasses could be replaced, wholly or in part, by a liquid energy source (propylene glycol being selected for this purpose) and whether its visocity effect could be enhanced or replaced by the use of a thixotropic agent ("Viscofas" — a copolymer of methyl vinyl ether and maleic anhydride — being selected for this purpose.

MATERIALS AND METHODS

Formulations Tested

Details of the formulations tested are given in Table II. Thirty-three solutions were made up in batches of five. These batches differed in the levels of inclusion of urea, urea phosphate, molasses and propylene glycol and within each batch grade rates of Viscofas were added. One batch, nos: 1–6, acted as a control and consisted of the addition of graded levels of Viscofas to a standard proprietary liquid feed supplement, Promax — a product of Feed Service Ltd., Corsham, Wiltshire, — containing urea, molasses, phosphoric acid, trace elements and vitamins. Promax contains approximately 39% protein, of which 36% is from urea, and the declared energy content is 32% sugars.

Preparation of the Viscofas Gel Formulations Nos: 7–33

Each gel was formulated in a similar way. The urea, urea phosphate, or mixture of both, was first mixed by grinding with a quantity of the Viscofas powder. A quantity of water or propylene glycol was then added to make a thin paste. This paste was then heated at 85° for 30 minutes or until gel formation occurred.

The resulting gel was then added to the remaining ingredients, for the particular formulation, which had previously been mixed together. The final formulation was then mixed and made up to 100% by weight and allowed to stand to observe any separation. The viscosity was then measured.

Observation of the Degree of Dispersion and Sedimentation Rate of the Mineral Salts Visual observations were made of the degree of dispersion and the sedimentation rate of the mineral salts. The observations were carried out over a period of fourteen days.

Measurement of the Thickening Ability of Viscofas

The viscosity of the different formulations was carried out using a Roto Viska viscometer. The viscosity was measured in poise units at a standard temperature of 250.

Effect of the Viscofas Concentration on the Intake of Feed and Water by Goats Two fistulated goats were used in this study. They were both offered a standard diet and ad lib access to water for a period of ten days. During this time, daily records were kept of feed and water intake and milk yield. Samples of rumen contents were taken on the last two days of this control period and analysed for free ammonia and individual volatile fatty acids content.

At the end of this period a Promax solution containing 0.5% Viscofas was offered to supply one pint of the material per day per 500 kg body-weight.

RESULTS

Relationships between the Levels of Inclusion of Viscofas, Formulation and Viscosity The relationships between the level of use of the different ingredients in the various formulations and the viscosity are tabulated in Table II.

Promax/Viscofas Formulations Nos: 1 to 6

The results given in Table II show that a linear relationship exists between the level of addition of Viscofas to Promax and the resulting viscosity. Thus the original viscosity of the Promax solution (one poise) can be increased by 100% by the addition of 0.2% Viscofas.

Supplements based on a Urea/Phosphoric Acid/Molasses mixture

Formulations Nos: 7 to 11 represent a supplement made up to simulate Promax and was formulated on the basis of information supplied by FSL. The results, given in Table II, show that this simulated Promax had a tenfold greater viscosity than that supplied by FSL. Addition of Viscofas to this mixture gave a greater increase in viscosity per 0.1% Viscofas than with the FSL Promax.

Supplements based on Urea Phosphate

Formulations Nos: 12 to 16 involved the substitution of urea phosphate for urea and phosphoric acid in the Promax type supplement (Formulations Nos: 7 to 11). The results of this formulation exercise are given in Table II. In the absence of Viscofas these formulations had viscosities below that of the simulated Promax but better than FSL's Promax. Addition of Viscofas was not quite as effective at improving the viscosity as with formulations Nos: 7 to 11 since it was necessary to exceed a level of addition of Viscofas of 1% before any discernible thickening effect was observed. Nevertheless there was a very marked improvement in viscosity over the range of addition of Viscofas of 1.8 – 2.0%. This effect may well be associated with the higher phosphate concentration in these formulations compared with formulations Nos. 7 to 11.

Supplements based on a Urea/Urea Phosphate Mixture Blended to Supply the Same Level of Phosphorus as Promax Formulations Nos: 17 to 21 were made up with a blended mixture of urea and urea phosphate to achieve the same levels of urea and phosphoric acid as occurred in formulations Nos: 7 to 11. The results of the tests with this batch of formulations are given in Table II. With these formulations, addition of Viscofas was more effective in improving the viscosity than had been found with formulation Nos: 12 to 16, where the urea phosphate was present at ca. six times the concentration. In formulations 17 to 21, a viscosity of 50 poise was achieved with only 1.4% Viscofas compared to 2.0% for formulations Nos: 12 to 16. This level of 1.4% Viscofas was, however, about twice that needed to achieve the same viscosity as in formulations Nos: 7 to 11 which were free from urea phosphate.

Substitution of Propylene Glycol for Molasses with Urea and Phosphoric Acid

Formulations Nos: 22 to 26 involved the substitution as an energy source, of propylene glycol for molasses in formulations Nos: 7 to 11. The effect of this on viscosity is demonstrated in Table II. Higher levels of Viscofas were required to achieve similar viscosities when propylene glycol was used, compared with the similar formulations Nos: 7 to 11 involving molasses, but on the other hand it was possible to dispense with the use of molasses altogether.

Substitution of Propylene Glycol for Molasses with Urea Phosphate substituted for Urea and Phosphoric Acid.

The results of such substitutions are demonstrated with formulations Nos: 27 to 31 in Table II. Comparing these results with those for formulations Nos: 12 to 16, a comparison of propylene glycol and molasses effects, again demonstrates the effect of urea phosphate in reducing the viscosity of the supplement but shows that the addition of higher levels of Viscofas makes it possible to dispense with the use of molasses altogether.

Substitution of Propylene Glycol for Molasses, with a Urea/Urea Phosphate Mixture substituted for Urea and Phosphoric Acid Only two formulations, Nos: 32, 33, were tested here - Table II. The results show that Viscofas had to be added in an amount in excess of 2% to achieve the same level of viscosity where molasses was used, but once again that the use of molasses can be dispensed with altogether.

Effect of Viscofas on the Dispersion and Sedimentation Rate of Mineral Salts

In all formulations where gelling occurred, associated with a viscosity in excess of 10 poise, the dispersion and suspension of the mineral salts was adequate and there was no evidence of sedimentation over 14 day test period.

Intake Trials

Effect on the intake of feed and water. The daily intakes of feed and water by two test goats during consecutive control and treatment periods of fourteen days each were measured. Addition of the Promax/Viscofas supplement to the diet increased the intakes of feed and water from mean values of 1.27 kg/day and 0.44 kg/day in the control period to 1.39 kg/day and 0.54 kg/day in the treatment period, respectively. Effect of the Promax/Viscofas Supplement on Rumen Function The effect of the Viscofas in the Promax supplement on rumen function was determined by the measurement of rumen pH, free ammonia concentration, microbial counts and the molar proportions of volatile fatty acids. The Viscofas/Promax solution was without effect on rumen pH and there was no consistent effect on the concentration of rumen ammonia. With the volatile fatty acid measurements the results suggested that the use of the Viscofas/Promax solution caused an elevation in the molar proportion of propionic acid in rumen fluid at the expense of the molar proportions of acetic acid. This is consistent with the addition of molasses to the rumen contents.

TABLE II

LEVEL OF INCLUSION % w/w

FORMULATION NUMBER

| INGREDIENTS | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| Urea | | | | | | | 10.0 | 10.0 | 10.0 | 10.0 | 10.0 | | | | | | | | | | |
| Urea-Phosphate | | | | | | | | | | | | 26.0 | 26.0 | 26.0 | 26.0 | 26.0 | | | | | |
| Phosphoric Acid | | | | | | | | | | | | | | | | | 6.7 | 6.7 | 6.7 | 6.7 | 6.7 |
| | | | | | | | 3.0 | 3.0 | 3.0 | 3.0 | 3.0 | | | | | | 4.3 | 4.3 | 4.3 | 4.3 | 4.3 |
| Molasses | 100 | 99.8 | 99.6 | 99.4 | 99.2 | 99.0 | 50.0 | 50.0 | 50.0 | 50.0 | 50.0 | 50.0 | 50.0 | 50.0 | 50.0 | 50.0 | 50 | 50 | 50 | 50 | 50 |
| Promax | | 0.2 | 0.4 | 0.6 | 0.8 | 1.0 | 0.2 | 0.4 | 0.6 | 0.8 | 1.0 | 0.6 | 1.2 | 1.8 | 2.4 | 3.0 | 0.4 | 0.8 | 1.2 | 1.6 | 2.0 |
| Viscofas | | | | | | | | | | | | | | | | | | | | | |
| Vit-Min Mix | | | | | | | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| Propylene Glycol Water to 100% | | | | | | | | | | | | | | | | | | | | | |
| Viscosity poise | 0.91 | 1.91 | 2.80 | 2.80 | 4.11 | 5.86 | 12.37 | 37.64 | 50.55 | 57.64 | 57.86 | 6.24 | 14.63 | 23.53 | 57.65 | 58.50 | — | 6.24 | 26.46 | 57.86 | 58.0 |

FORMULATION NUMBER

| | 22 | 23 | 24 | 25 | 26 | 27 | 28 | 29 | 30 | 31 | 32 | 33 |
|---|---|---|---|---|---|---|---|---|---|---|---|---|
| Urea | 10.0 | 10.0 | 10.0 | 10.0 | 10.0 | | | | | | | |
| Urea Phosphate | | | | | | 26.0 | 26.0 | 26.0 | 26.0 | 26.0 | | |
| Phosphoric Acid | 3.0 | 3.0 | 3.0 | 3.0 | 3.0 | | | | | | 6.7 | 6.7 |
| | | | | | | | | | | | 4.3 | 4.3 |
| Molasses | | | | | | | | | | | | |
| Promax | 0.6 | 1.2 | 1.8 | 2.4 | 3.0 | 0.6 | 1.2 | 1.8 | 2.4 | 3.0 | 1.0 | 2.0 |
| Viscofas | | | | | | | | | | | | |
| Vit-Min Mix | 2.5 | 2.5 | 2.5 | 2.5 | 2.5 | 2.5 | 2.5 | 2.5 | 2.5 | 2.5 | 2.5 | 2.5 |
| Propylene Glycol to 100% | | | | | | | | | | | | |
| Viscosity poise | 1.42 | 4.09 | 6.67 | 31.62 | 58.29 | — | 3.44 | 5.59 | 6.67 | 21.29 | 1.94 | 6.02 |

I claim:

1. An animal feed supplement composition suitable for animal feedstuffs, animal feed additives, and animal mineral supplements comprising a nitrogen-containing active ingredient selected from the group consisting of urea, urea-phosphate and mixtures thereof and a phosphorus-containing active ingredient selected from the group consisting of phosphoric acid, urea-phosphate and mixtures thereof, in admixture with a thixotropic agent of a copolymer of methylvinyl ether and maleic anhydride, said thixotropic agent being present in an amount such that, in the presence of added water and molasses the composition forms a pseudoplastic thixotropic gel having a viscosity in excess of 10 poise and containing between 0.2 and 3% of the said thixotropic agent by weight of the gel.

2. A composition as claimed in claim 1, comprising the nitrogen containing active ingredient in the form of a dry solid premixed with the dry thixotropic agent.

3. A composition as claimed in claim 1, comprising both active ingredients in the form of a concentrated solution, dispersion, emulsion or suspension premixed with the thixotropic agent.

4. A composition as claimed in claim 1 which is rendered free-flowing by shaking or pressure.